United States Patent [19]

Mayer

[11] Patent Number: 5,765,658
[45] Date of Patent: Jun. 16, 1998

[54] QUICK DISCONNECT LATCHING APPARATUS FOR A POWER ASSIST FOR A BICYCLE

[75] Inventor: Richard A. Mayer, Saugus, Calif.

[73] Assignee: Electric Bicycle Company, LLC, Burbank, Calif.

[21] Appl. No.: 668,772

[22] Filed: Jun. 24, 1996

[51] Int. Cl.⁶ ............................................. B62K 11/10
[52] U.S. Cl. ................................... 180/206; 180/221
[58] Field of Search .......................... 180/205, 206, 180/221

[56] References Cited

U.S. PATENT DOCUMENTS

| | | | |
|---|---|---|---|
| 3,966,007 | 6/1976 | Havener et al. | 180/221 X |
| 3,978,936 | 9/1976 | Schwartz | 180/205 X |
| 4,044,852 | 8/1977 | Lewis et al. | 180/206 |
| 4,143,730 | 3/1979 | Desmond | 180/205 X |
| 4,200,164 | 4/1980 | Pearne | 180/206 |
| 5,423,393 | 6/1995 | Felt | 108/221 |

*Primary Examiner*—Joseph D. Pape
*Attorney, Agent, or Firm*—Jack C. Munro

[57] ABSTRACT

A power assist apparatus is to be mounted in a straddling position about the rear wheel of a bicycle. The power assist apparatus includes a housing with this housing to be mounted on a support bracket assembly which is fixedly mounted on the frame of the bicycle. The support bracket assembly includes pins which are to connect with the housing of the power assist apparatus. The latching assembly is to connect between the frame of the bicycle and the housing of the power assist apparatus with this latching assembly to be movable between a latched position and an unlatched position.

5 Claims, 3 Drawing Sheets

QUICK DISCONNECT LATCHING APPARATUS FOR A POWER ASSIST FOR A BICYCLE

BACKGROUND OF THE INVENTION

1) Field of the Invention

The field of this invention relates to bicycles and more particularly to a quick disconnect latching apparatus that is to be used to removably mount a power assist apparatus onto a bicycle.

2) Description of the Prior Art

Electric power systems that are designed to give a power assist in the manual operation of a bicycle have long been known. Reference is to be had to U.S. Pat. application Ser. No. 08/523,193, filed Sep. 5, 1995 in which the present inventor is the co-inventor of an invention entitled POWER ASSIST APPARATUS FOR A MANUALLY OPERATED VEHICLE. This patent application discloses a power assist apparatus with the power assist provided by an electric motor assembly which is mounted within a housing with this housing being mounted in a straddling manner over the rear wheel of the bicycle.

It has been found that in the manufacturing of the bicycle and the power assist apparatus, it would be better from a shipping point of view to not have the power assist apparatus mounted on the bicycle. This would permit a substantial greater number of bicycles and power assist apparatuses to be placed within a single shipping container or truck which results in a substantial decrease of shipping cost.

Additionally, to the user, the power assist apparatus is generally the most expensive part of the bicycle. Upon a user going to a certain location, such as a place of employment or a store, it is common practice for the user to lock a bicycle in order to prevent theft of the bicycle. If the power assist apparatus is mounted on the bicycle, the bicycle becomes a more desirable item to steal. The power assist apparatus should be mounted on the bicycle so as to deter its removal by a non-authorized individual.

Additionally, the power assist apparatus, which has been disclosed in the aforementioned patent application, is a self-contained unit which includes batteries, motors and a drive wheel. At times, there is required maintenance on the apparatus which may include replacement of the batteries. If the apparatus could be separated from the bicycle, this maintenance could be performed in a more convenient manner than if the apparatus is mounted on the bicycle.

SUMMARY OF THE INVENTION

The primary objective of the present invention is to construct a quick disconnect latching apparatus that is to be utilized between a bicycle and a power assist apparatus for the bicycle which would permit the power assist apparatus to be quickly disengaged and removed from the bicycle permitting the power assist apparatus to be moved to a location separate from the bicycle.

Another objective of the present invention is to construct a latching apparatus which can be incorporated in conjunction with the power assist apparatus for a bicycle where the latching apparatus is composed of few parts, operates most efficiently, securely mounts the power assist apparatus on the bicycle yet permits quick and easy separation of the power assist apparatus from the bicycle.

A bicycle which includes a frame is mounted between a pair of supporting wheels. Straddled about the rear wheel of the bicycle is a power assist apparatus with this power assist apparatus being self-contained and included within a housing. Mounted on the frame of the bicycle is a pair of support bars with each support bar including a pair of pins. The housing of the power assist apparatus includes a pair of latching bars. Each pair of pins of each support bar is to interlock with a latching bar. Initial positioning of the latching bar on the housing is to be adjustable, and when the desired position is obtained, the latching bar is fixedly mounted in that position. The pins of the support bars is to permit a limited degree of longitudinal adjustment of the housing on the support bars. A latching assembly is fixedly mounted onto the frame of the bicycle with the latching assembly to engage with the latching bars. The latching assembly is to be movable from a latched position to an unlatched position. When in the latched position, the power assist apparatus is fixedly secured onto the frame of the bicycle. When in the unlatched position, the power assist apparatus can be disengaged and removed from the bicycle.

DETAILED DESCRIPTION OF THE PREFERRED EMBODIMENT

Figure 1:
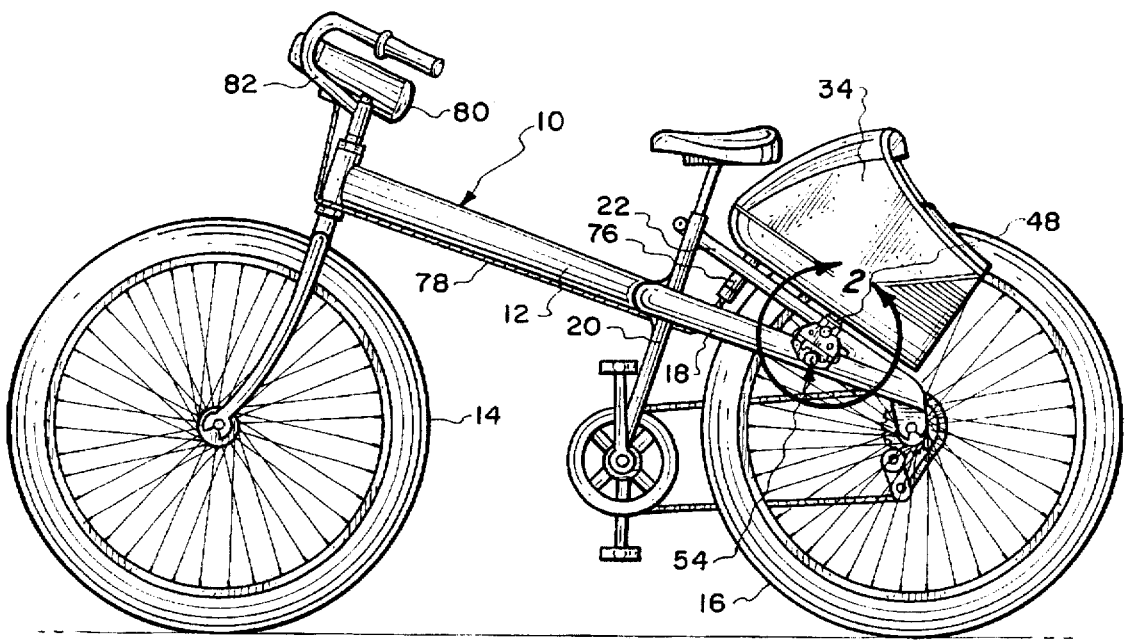
FIG. 1 is a side elevational view of the bicycle with a typical power assist apparatus mounted thereon showing the quick disconnect latching apparatus of the present invention latchingly connecting with the power assist apparatus.

Referring particularly to the drawings, there is shown in FIG. 1 a bicycle 10 which has a frame 12 mounted between a front wheel 14 and a rear wheel 16. The frame 12 includes a rear fork which is defined by a pair of closely spaced apart legs with only leg 18 being shown. The rear wheel 16 is mounted between the legs of the rear fork. The rear fork, which includes leg 18, extends from the seat post 20. Also extending from the seat post 20 approximately where the rear wheel 16 connects with the rear fork is a bracing fork which includes a pair of closely spaced apart legs with only leg 22 being shown. The bracing fork and rear fork, which includes legs 18 and 22, will normally be constructed of a metallic tubular material with generally steel or aluminum being preferred or a desirable alloy thereof.

To be mounted on each of the legs of the bracing fork, which includes leg 22, is a support bracket assembly. The support bracket assembly includes the support bracket 24 which is mounted on the leg 22. The support bracket 24 is fixed onto the leg 22 as by welding. The support bracket 24 is basically L-shaped and has an outer leg 26. Integrally mounted on the outer leg 26 is a pair of spaced apart pins 28 and 30. Pin 28 is to pass through elongated over-sized hole 32 of a housing 34. Pin 30 similarly passes through an elongated over-sized hole 36 formed within the housing 34. Housing 34 encloses the power assist apparatus which is mounted in a straddling manner about the rear wheel 16. It is to be understood that one portion of the housing 34 is mounted on the support bracket 24 with another portion of the housing 34 being mounted on a similar support bracket which is mounted on the leg of the rear bracing fork (not shown). Because of the elongated oversized holes 32 and 36, there is a limited amount of longitudinal adjustment of the housing 34 on the support brackets with only support bracket 24 being shown. The reason for this is to allow for adjustability so that the desired position of the housing 34 can be obtained on the support brackets, such as support bracket 24.

Pin 28 also connects with elongated slot 38 of a latching bar 40. A bolt fastener 42 also connects with the slot 38 and functions to securely mount one end of the latching bar 40 to the housing 34. In a similar manner, a bolt fastener 44 connects with the elongated slot 46 which securely mounts the opposite end of the latching bar 40 to the housing 34. The pin 30 similarly connects with the elongated slot 46. When initially mounting the latching bar 40 onto the housing 34, the slots 38 and 46 permit longitudinal adjustment in establishing the position of the latching bar 40 prior to it being fixedly secured to the housing 34 by means of the bolt fasteners 42 and 44. Also, the elongated slots 38 and 46 provide clearance respectively for the pins 28 and 30.

The latching bar 40 includes a downwardly depending latch hook 48. The latch hook 48 is to be engageable with an upwardly extending latch hook 50. The latch hook 50 is slidably mounted within a guide plate 52 of a latching mechanism 54. The lower end of the guide plate 52 is pivotly mounted on a spring retainer 56. The spring retainer 56 is affixed to a mounting bracket 58 with this mounting bracket 58 being fixedly secured by appropriate fasteners to leg 18. It is to be understood that there are two separate latching mechanisms 54, one for each of the legs with only the latching mechanism 54 for leg 18 being shown.

Figures 4, 5:
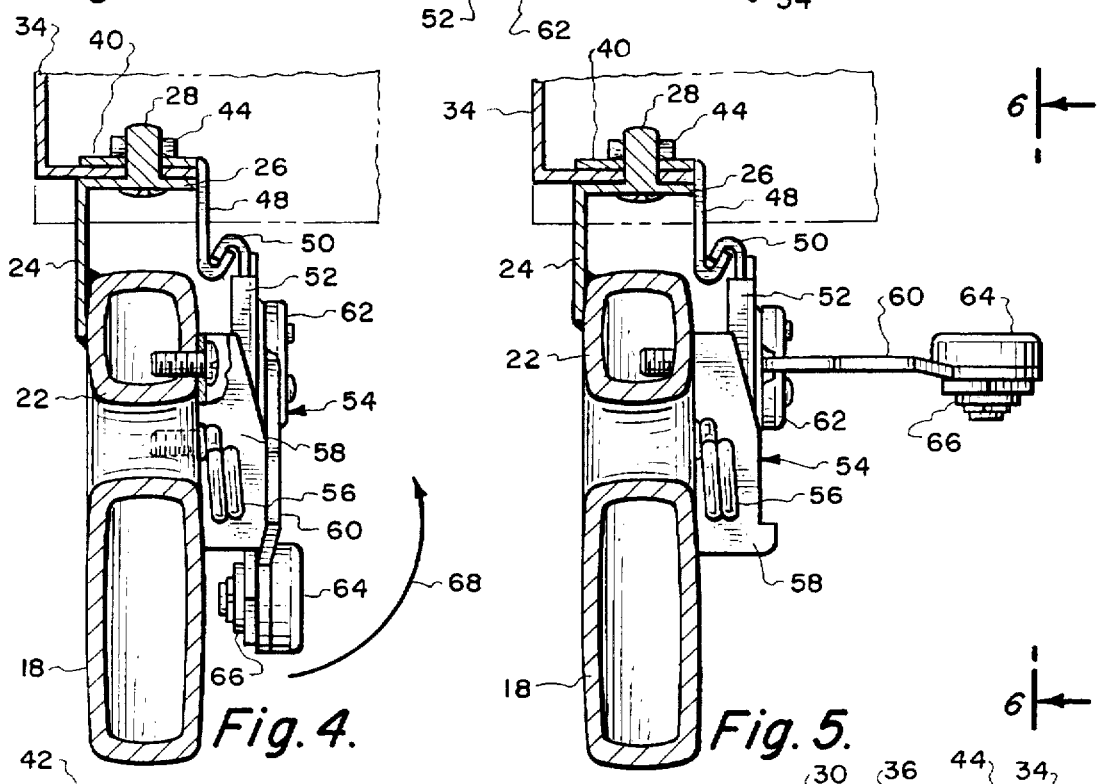
FIG. 4 is a transverse cross-sectional view through the quick disconnect latching apparatus of the present invention showing the latching apparatus in the latched position but with the latching apparatus unlocked.
FIG. 5 is a cross-sectional view similar to that of FIG. 4 but showing the latching apparatus being moved to and located in an intermediate position prior to movement of the latching apparatus to the unlatched position.
Figure 6:
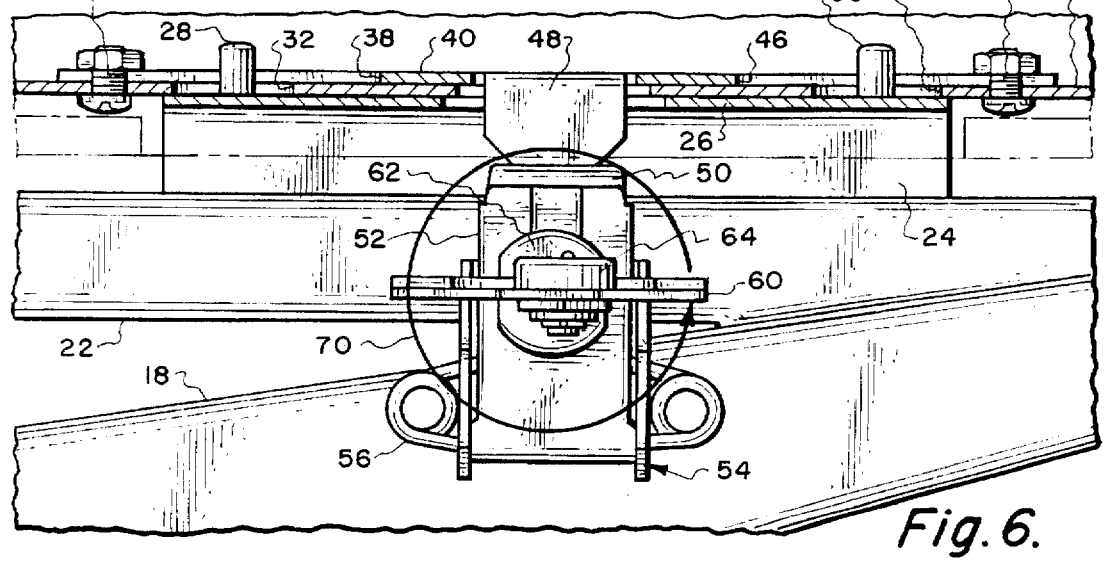
FIG. 6 is a side elevational view of the quick disconnect latching apparatus of the present invention taken along line 6—6 of FIG. 5.
Figure 7:
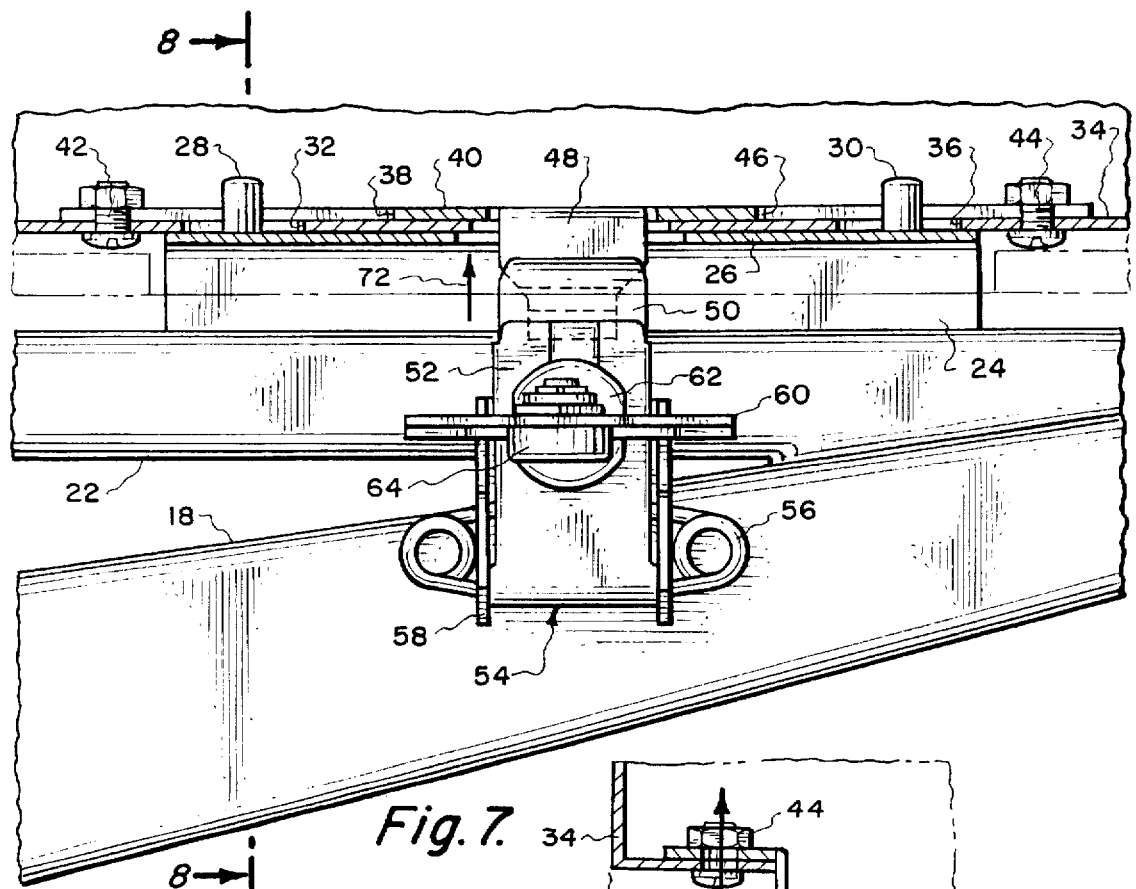
FIG. 7 is a view similar to that of FIG. 6 but showing the latching apparatus located in the unlatched position.

Pivotly mounted onto the guide plate 52 is a handle 60. The handle 60 is mounted onto a knob 62. Knob 62 is pivotly mounted onto the guide plate 52. The inner surface of knob 62 includes a pin (not shown) which connects in a slot (not shown) of the latch hook 50. The handle 60 is pivotable about one-hundred eighty degrees from the position shown in FIG. 6 to the position shown in FIG. 7. In the position shown in FIG. 6, the latch hook 50 is located in a lower position relative to the guide plate 52 and is to tightly engage with the latch hook 48 as is clearly shown in FIGS. 4 and 5 of the drawings. However, with the handle 60 pivoted about one-hundred eighty degrees to the position shown in FIG. 7, the guide plate 52 will be forced to an outwardly extending position as is shown in FIG. 8 (unlatched position but not completely unlatched) which results in latch hook 50 being located some spaced distance from latch hook 48.

There is to be incorporated in conjunction with the handle 60 a key actuated lock 64. The key actuated lock 64 turns a pawl 66 approximately ninety degrees. The pawl 66 moves in the direction of arrow 67. The pawl 66 can be located between the mounting bracket 58 and the spring retainer 56 which will locate the latching mechanism 54 in a locked position preventing turning of the handle 60 as well as any other movement of the latching mechanism 54. With the latch hooks 48 and 50 tightly engaged, this locking position of the latching mechanism 54 is to be the established position.

Locating of a key within the key lock 64 and turning of the key will move the pawl 66 approximately ninety degrees displacing it from the area between the mounting bracket 58 and the spring retainer 56. This will then permit the handle 60 to be pivoted relative to the knob 62 from the position shown in FIG. 4 to the position shown in FIG. 5. This direction of movement of the handle 60 is depicted by arrow 68. The user then rotates the handle about the knob 62 in a counter-clockwise direction as is depicted by arrow 70 in FIG. 6. This rotation of the handle 60 causes the latch hook 50 to be moved to the upwardly extending position (unlatched position but not completely unlatched) as is clearly shown in FIG. 8 of the drawings. This displaces the latch hook 50 from the latch hook 48 as is depicted by arrow 72 in FIG. 7 and as is clearly shown in FIG. 8.

Figures 8, 9:
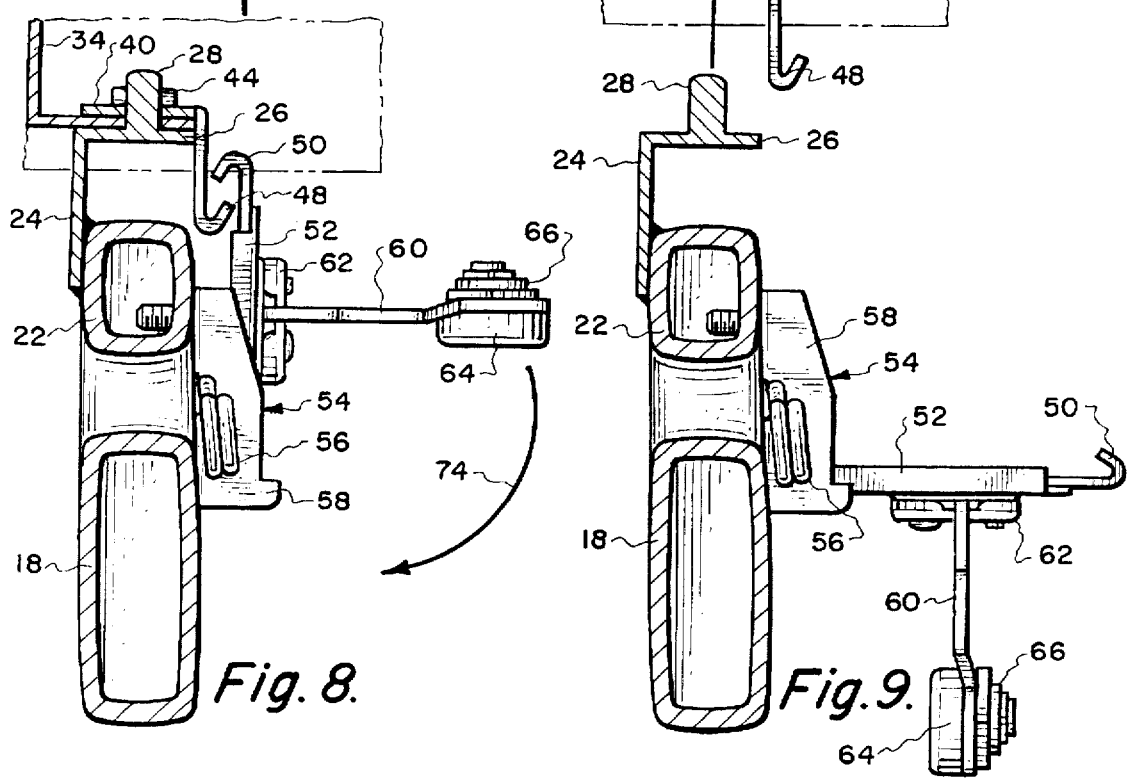
FIG. 8 is a cross-sectional view of the quick disconnect latching of the present invention taken along line 8—8 of FIG. 7.
FIG. 9 is a cross-sectional view similar to that of FIG. 8 but showing movement of the latching apparatus to a displaced position permitting removal of the power assist apparatus from the bicycle.

The user then pivots the handle 60 and guide plate 52 relative to the spring retainer 56 with this pivoting motion being depicted by arrow 74 in FIG. 8. In this position, the latch hook is moved to a displaced out-of-the-way position spaced some distance from the latch hook 48. This will now permit the housing 34 to be separated from the bicycle 10. However, this separation does require disengagement of electrical connector 76 which supplies electrical power to electrical conductor 78. Electrical conductor 78 connects with control box 80 which is mounted on the front handlebar 82 of the bicycle 10.

Figure 2:
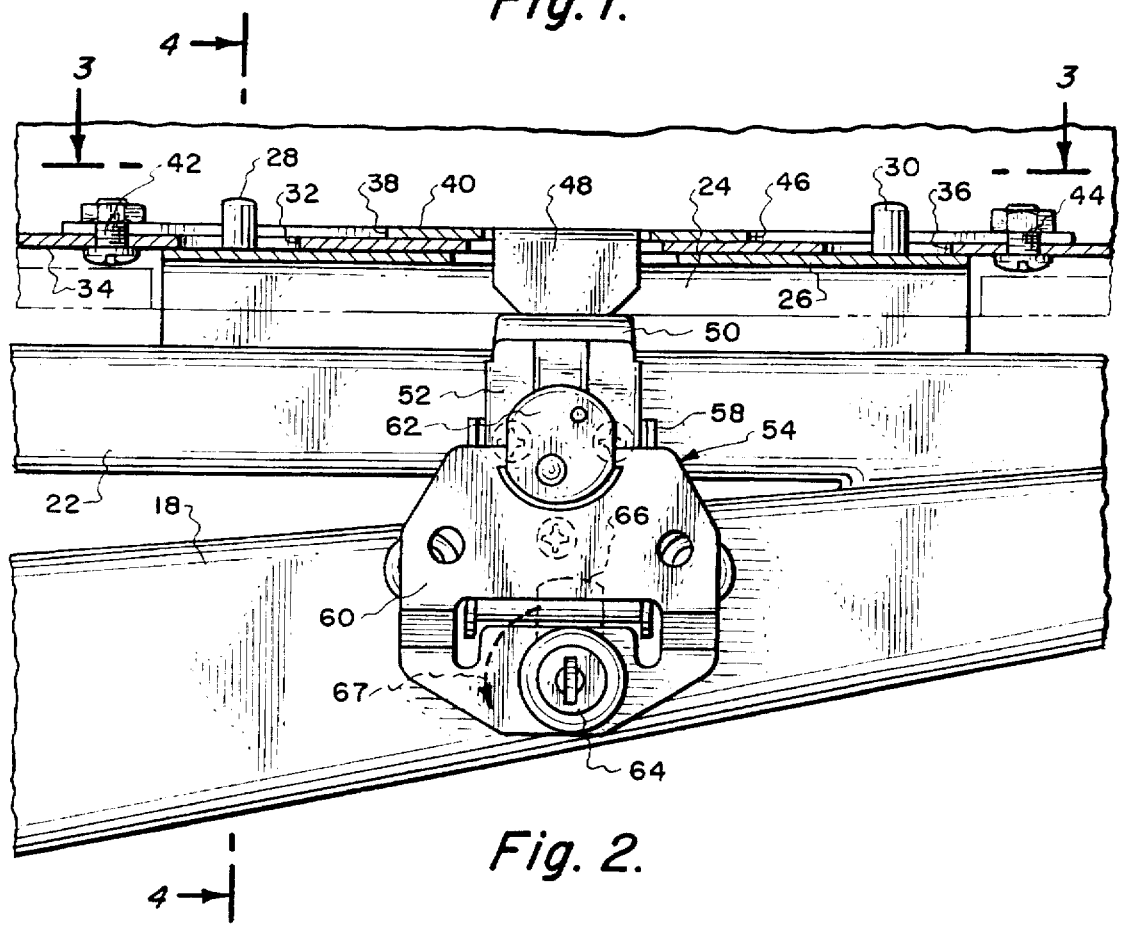
FIG. 2 is an enlarged view, partly in cross-section, of the quick disconnect latching apparatus of the present invention taken along line 2—2 of FIG. 1 showing the latching apparatus in the latched position.
Figure 3:
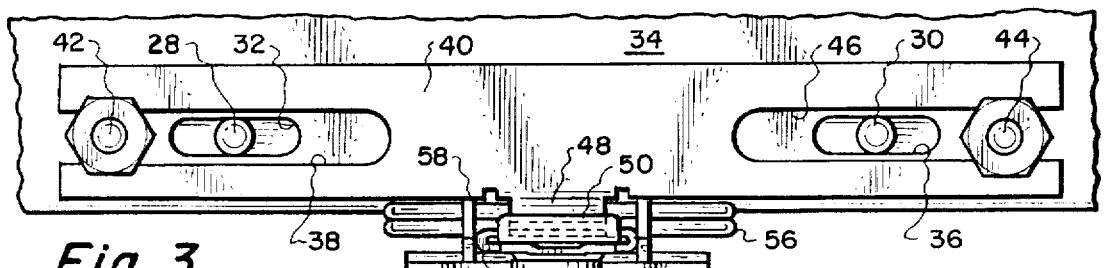
FIG. 3 is a top plan view of the quick disconnect latching apparatus of this invention taken along line 3—3 of FIG. 2.

When it is desired to reinstall in position the housing 34 on the bicycle 10, the operator places the housing 34 so that it straddles the rear wheel 16 with pins 28 and 30 respectively connecting with elongated slots 38 and 46. The operator then pivots the handle 60 and guide plate 52 from the position of FIG. 9 to that of FIG. 8 and then aligns the latch hook 50 with the latch hook 48. The operator then pivots the handle 60 approximately one-hundred eighty degrees from the position shown in FIG. 8 to that shown in FIG. 5. This will cause the latch hook 50 to tightly engage the latch hook 48. The operator then pivots the handle 60 in a direction opposite arrow 68 so that the handle 60 will abut against the mounting bracket 58. The operator can then operate the key operated lock 64 and cause the pawl 66 to be moved into the locking position which is shown in dotted lines in FIG. 2 (locked position) of the drawings. When both of the latching mechanisms 54 are installed and locked, the power assist apparatus mounted within the housing 34 is securely mounted onto the bicycle 10. The electrical connector 76 is to be engaged and the power assist apparatus mounted within the housing 34 is then capable of being utilized to assist in propelling of the bicycle 10 once the power assist apparatus is turned to the On position.

What is claimed is:

1. In combination with a bicycle, said bicycle having a frame, a power assist apparatus mounted on said bicycle, said power assist apparatus being mounted within a housing, a quick disconnect latching apparatus for securing said power assist apparatus on said bicycle, said quick disconnect latching apparatus comprising:

a latching bar mounted on said housing of said power assist apparatus;

a support bracket assembly mounted on said frame of said bicycle, said support bracket assembly to support said housing on said frame, said support bracket assembly including interlocking means, said interlocking means to interlock with said latching bar thereby locking together said housing and said support bracket assembly; and a latching assembly mounted on said frame of said bicycle, said latching assembly to be movable between a latched position and an unlatched position, said latched position engaging said latching assembly with said latching bar thereby fixing said housing onto said frame of said bicycle, said unlatched position permitting disengagement of said power assist apparatus from said bicycle.

2. In combination with a bicycle, said bicycle having a frame, a power assist apparatus mounted on said bicycle, said power assist apparatus being mounted within a housing, a quick disconnect latching apparatus for securing said power assist apparatus on said bicycle, said quick disconnect latching apparatus comprising:

a latching bar mounted on said housing;

a support bracket assembly mounted on said frame, said support bracket assembly to support said housing on said frame, said support bracket assembly including interlocking means, said interlocking means to interlock with said latching bar thereby locking together said housing and said support bracket;

a latching assembly mounted on said frame, said latching assembly to be movable between a latched position and an unlatched position, said latched position engaging said latching assembly with said latching bar thereby fixing said housing onto said frame, said unlatched position permitting disengagement of said power assist apparatus from said bicycle;

said bicycle having a wheel, said power assist apparatus straddling said wheel, there being two in number of said latching bars with a said latching bar to be located on each side of said wheel, said latching bars being adjustably mounted on said housing, upon the proper position being obtained for each said latching bar each said latching bar being fixed in position on said housing.

3. The combination as defined in claim 2 wherein:

said support bracket assembly comprising two in number of support brackets, there being a said support bracket located on each side of said wheel, each said support bracket including a pair of spaced apart pins, said pins comprising said interlocking means.

4. The combination as defined in claim 3 wherein:

each said pin engaging with an oversized hole formed in said housing and with an elongated slot formed in its respective said latching bar, whereby the initial position of said housing can be adjusted relative to said frame defined by the limits of the length of said oversized hole.

5. In combination with a bicycle, said bicycle having a frame, a power assist apparatus mounted on said bicycle, said power assist apparatus being mounted within a housing, a quick disconnect latching apparatus for securing said power assist apparatus on said bicycle, said quick disconnect latching apparatus comprising:

a latching bar mounted on said housing;

a support bracket assembly mounted on said frame, said support bracket assembly to support said housing on said frame, said support bracket assembly including interlocking means, said interlocking means to interlock with said latching bar thereby locking together said housing and said support bracket;

a latching assembly mounted on said frame, said latching assembly to be movable between a latched position and an unlatched position, said latched position engaging said latching assembly with said latching bar thereby fixing said housing onto said frame, said unlatched position permitting disengagement of said power assist apparatus from said bicycle;

said latching assembly being lockable by a lock mechanism when in said latched position.

* * * * *